United States Patent
Sumida et al.

(10) Patent No.: US 6,882,381 B2
(45) Date of Patent: Apr. 19, 2005

(54) LIQUID CRYSTAL DISPLAY APPARATUS AND ELECTRONIC DEVICE INCORPORATING THE SAME

(75) Inventors: Yukihiro Sumida, Yamatokoriyama (JP); Takeshi Masuda, Kyoto (JP); Tsuyoshi Ebi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/668,217

(22) Filed: Sep. 24, 2003

(65) Prior Publication Data

US 2004/0061818 A1 Apr. 1, 2004

Related U.S. Application Data

(62) Division of application No. 09/292,595, filed on Apr. 16, 1999, now Pat. No. 6,628,352.

(30) Foreign Application Priority Data

Apr. 17, 1998 (JP) .......................................... 10-107410
Dec. 24, 1998 (JP) .......................................... 10-365863

(51) Int. Cl.$^7$ ............................................ G02F 1/1335
(52) U.S. Cl. ........................... 349/61; 349/65; 349/106
(58) Field of Search ........................... 349/61, 64, 62, 349/63, 65, 106, 110, 137; 362/31, 36

(56) References Cited

U.S. PATENT DOCUMENTS

| 5,760,857 | A | | 6/1998 | Yamagawa et al. |
| 5,788,356 | A | * | 8/1998 | Watai et al. .................. 362/31 |
| 5,808,709 | A | | 9/1998 | Davis et al. |
| 5,828,471 | A | | 10/1998 | Davis et al. |
| 6,048,071 | A | | 4/2000 | Sawayama |
| 6,124,971 | A | * | 9/2000 | Ouderkirk et al. .......... 359/487 |
| 6,151,089 | A | | 11/2000 | Yang et al. |
| 6,259,499 | B1 | * | 7/2001 | Yamanashi ................. 349/113 |
| 6,266,108 | B1 | * | 7/2001 | Bao et al. ..................... 349/63 |
| 6,288,760 | B1 | | 9/2001 | Sawayama |
| 6,329,968 | B1 | | 12/2001 | Cornelissen et al. |

FOREIGN PATENT DOCUMENTS

| JP | 61-23884 | 5/1994 |
| JP | 3-003427 | 8/1994 |
| JP | 8-68997 | 3/1996 |

* cited by examiner

Primary Examiner—Tarifur R. Chowdhury
Assistant Examiner—Mike Qi
(74) Attorney, Agent, or Firm—Birch, Stewart, Kolasch & Birch, LLP

(57) ABSTRACT

A liquid crystal display apparatus includes: an illumination section having a light source and an optical guide member, and a reflection type LCD having a display region including a plurality of pixels for performing a display function, the optical guide member having first and second principal faces opposite to each other and first and second end faces opposite to each other. The reflection type LCD is disposed on or above the first principal face of the optical guide member. Light from the light source enters the optical guide member at the first end face, exits the optical guide member at the first principal face so as to be incident on the reflection type LCD and reflected therefrom, reenters the optical guide member at the first principal face, and exits the optical guide member at the second principal face toward a viewer.

21 Claims, 16 Drawing Sheets

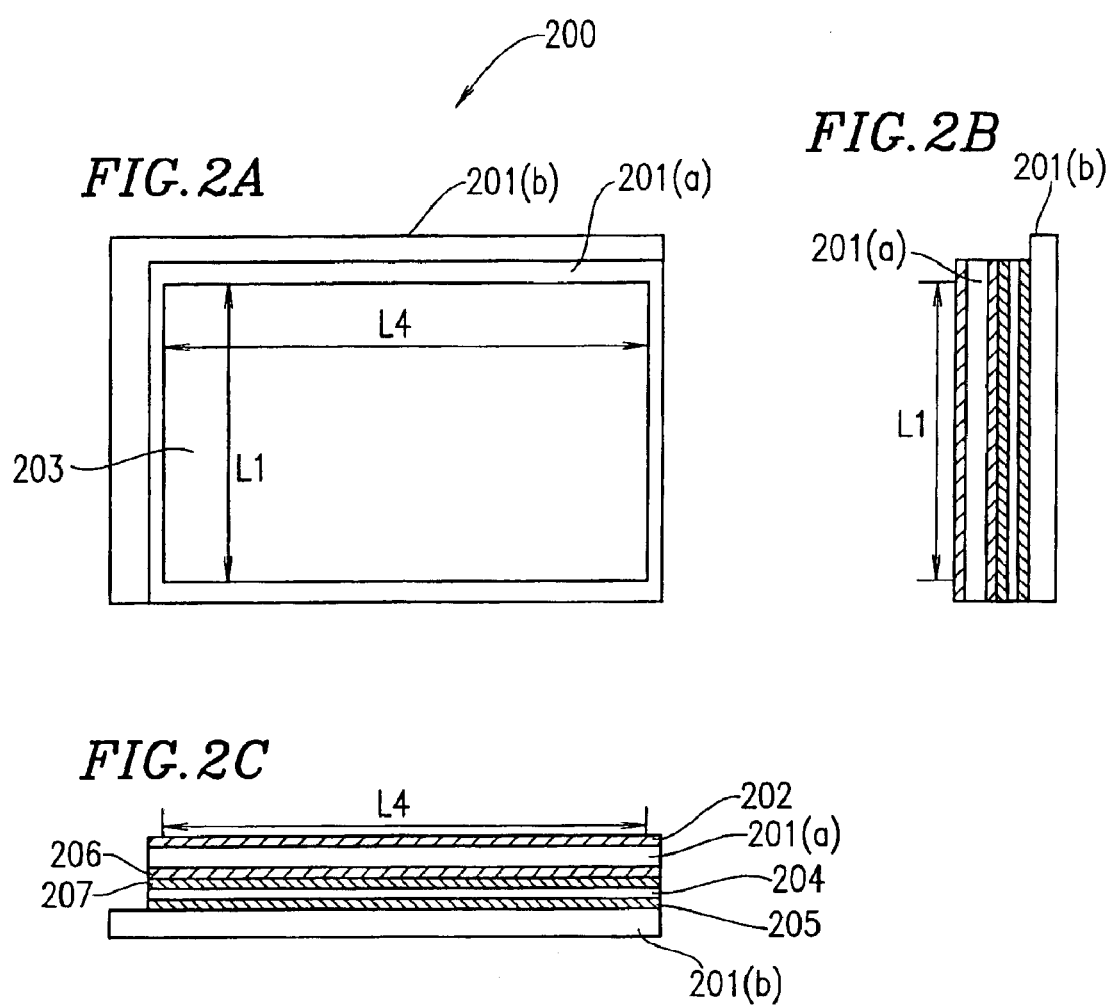

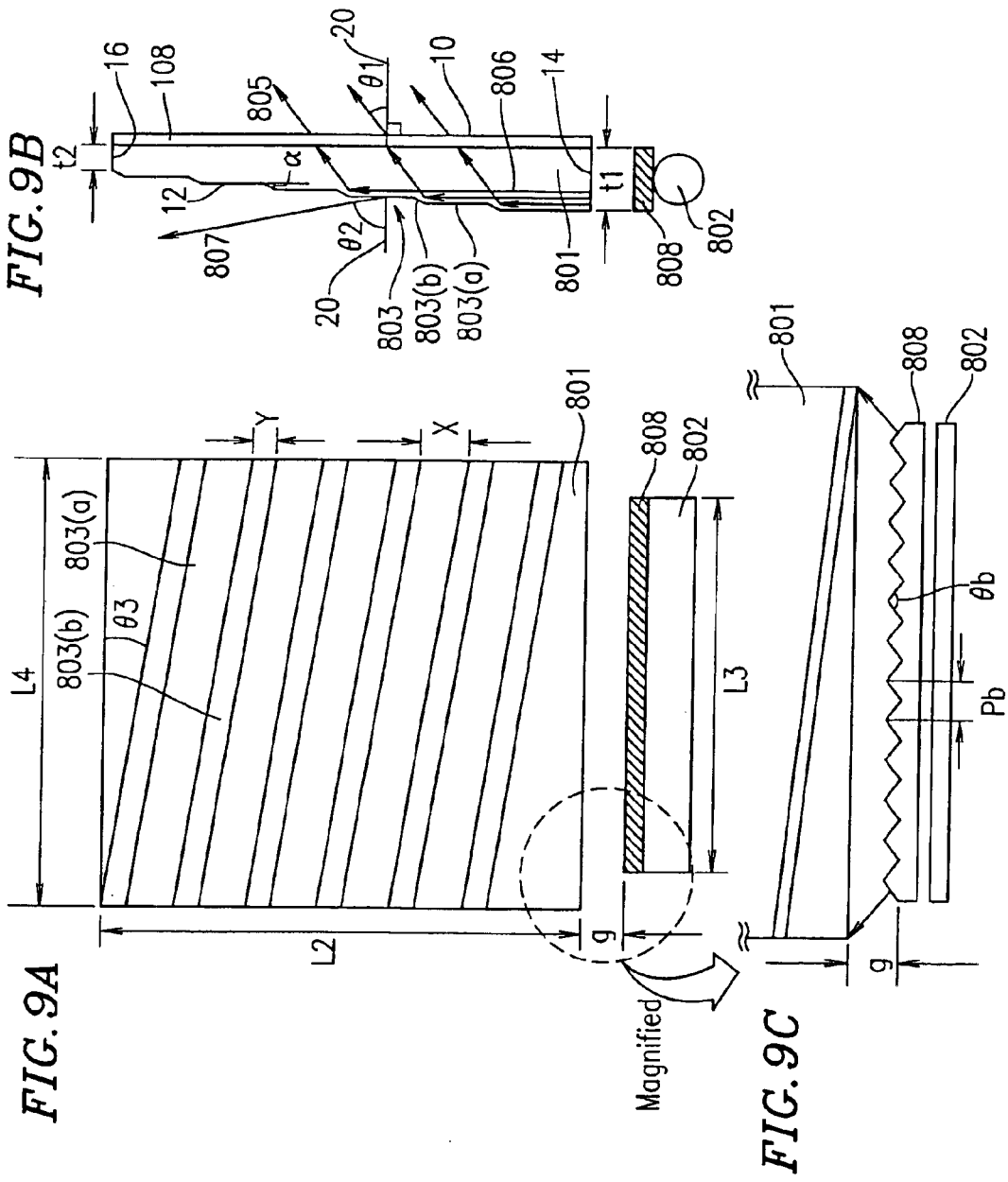

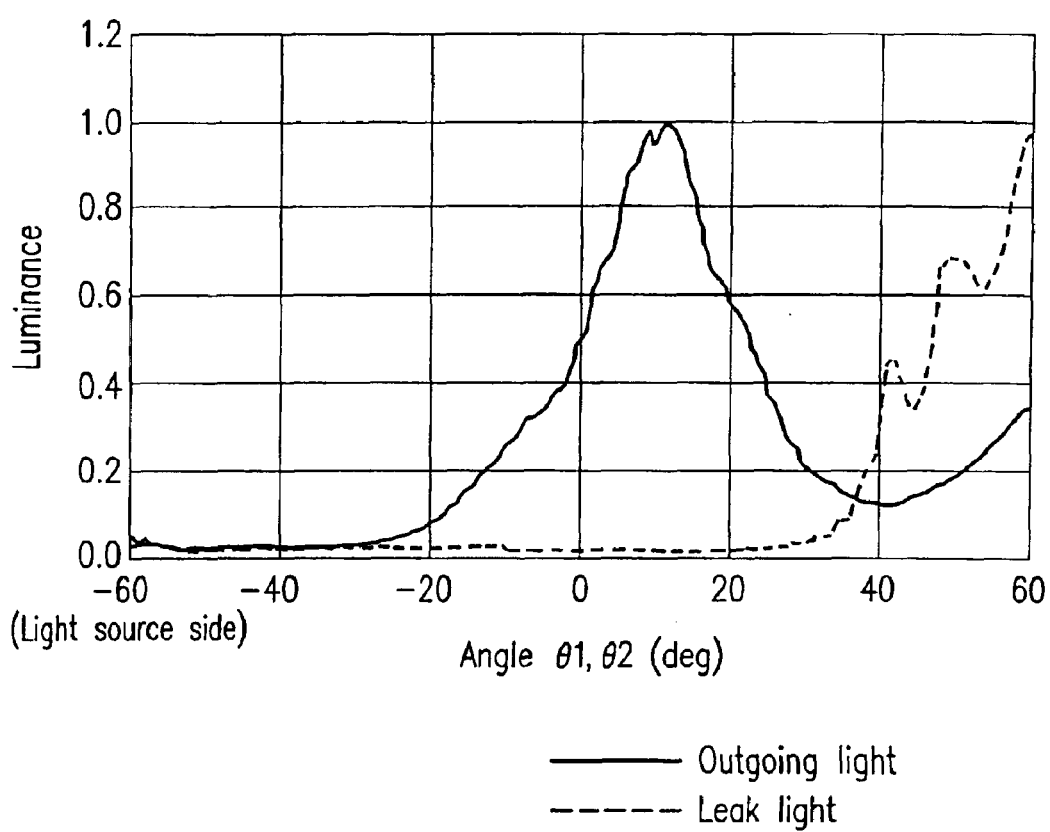

FIG.15

| Angle of tilt α (deg) | Outgoing light θ1 (deg) |
|---|---|
| 5 | From 64 to 90 |
| 10 | From 52 to 90 |
| 15 | From 43 to 90 |
| 20 | From 34 to 90 |
| 25 | From 26 to 90 |
| 30 | From 18 to 90 |
| 35 | From 11 to 90 |

LIQUID CRYSTAL DISPLAY APPARATUS AND ELECTRONIC DEVICE INCORPORATING THE SAME

This application is a Divisional of Application Ser. No. 09/292,595, filed on Apr. 16, 1999 now U.S. Pat. No. 6,628,352, the entire contents of which are hereby incorporated by reference and for which priority is claimed under 35 U.S.C. § 120; and this application claims priority of Application Nos. 10-107410 and 10-365863 filed in Japan on Apr. 17, 1998 and Dec. 24, 1998, respectively, under 35 U.S.C. § 119.

BACKGROUND OF THE INVENTION

1. Field of the Invention

The present invention relates to a liquid crystal display apparatus, more particularly to a front lit LCD apparatus, and a portable electronic device incorporating such a liquid crystal display apparatus.

2. Description of the Related Art

Liquid crystal display apparatuses display characters and/or images by adjusting the amount of transmitted portions of light from a light source. The liquid crystal itself does not emit light, unlike CRT (cathode ray tube) devices, PDP (plasma display) devices, and EL (electroluminescence) devices.

Conventional liquid crystal display apparatuses are generally classified into transmission type liquid crystal display apparatuses and reflection type liquid crystal display apparatuses. A transmission type liquid crystal display apparatus incorporates a light source or "back light" of a planar configuration (e.g., a fluorescent tube or an EL device) provided behind an LCD (liquid crystal display) device.

A reflection type liquid crystal display apparatus has an advantage in that it performs a display function by utilizing ambient light. As a result, a reflection type liquid crystal display apparatus does not require a back light, and consumes relatively small power. Furthermore, reflection type liquid crystal display apparatuses provide improved visibility in very bright conditions (e.g., indirect sunlight) where a transmission type liquid crystal display apparatus or any emission type display device would provide poor visibility. Therefore, portable information terminal devices and mobile computers, which have enjoyed increasing demand in recent years, often employ reflection type liquid crystal displays.

However, a reflection type liquid crystal display apparatus has the following problems: since a reflection type display apparatus utilizes ambient light for display, its display luminance depends on the environment in which it is used. Accordingly, an image that is displayed on a reflection type display apparatus may become totally illegible in the dark, e.g., at night. This becomes particularly problematic for reflection type display apparatuses incorporating a color filter for color display functions because they require even more ambient light than monochrome display apparatuses.

As one solution to the above problem, a semi-transmission type liquid crystal display apparatus has been proposed which incorporates a half mirror as a reflector. However, half mirrors require a complicated manufacturing process. Moreover, since the structure of a half mirror in itself does not make for highly efficient utilization of light, a semi-transmission type liquid crystal display apparatus incorporating a half mirror does not provide excellent display quality.

Accordingly, a reflection type display apparatus has been proposed which employs a means for illuminating a reflection type display device from the front as an auxiliary illumination device in a dark environment.

An example of an auxiliary frontal illumination device is disclosed in Japanese Utility Model Registration No. 3003427. The disclosed illumination device includes an optical guide member which is disposed in front of an object to be illuminated so as to cover the entire face thereof, the optical guide member having a light controlling surface, as well as a cold cathode fluorescent tube disposed at an edge portion of the optical guide member.

Examples of back-lighting techniques are disclosed in Japanese Laid-Open Publication Nos. 6-123884 and 8-68997, for example. The 6-123884 publication discloses an optical guide member including stripe lenses extending in a direction at an angle with respect to the direction in which the pixels of a transmission type display device are arrayed, thereby minimizing the generation of moire fringes.

According to this technique, an image is perceived by a viewer as the illumination light from the back light source travels through the stripe lenses of the optical guide member and the pixels of the transmission type LCD so as to reach the eyes of the viewer. The pitch of the stripe lenses of the optical guide member and the period of the pixels of the transmission type LCD would normally interfere with each other to cause moire fringes. However, by retaining an angle between the stripe lenses of the optical guide member and the pixels of the transmission type LCD, this technique sufficiently shortens the period of the moire fringes to prevent the viewer from perceiving them.

Japanese Laid-Open Publication No. 8-68997 discloses a back light including two prism sheets such that an angle is retained between the direction of the prism grooves provided in two prism sheets and the direction along which pixels of a transmission type display device are arrayed, thereby minimizing the generation of moire fringes.

The illumination light from the back light travels through the two prism sheets and the pixels of the transmission type LCD before it reaches the eyes of a viewer, so that the interference between the periods of these three elements would normally generate moire fringes. According to this technique of retaining an angle between the three elements, the period of the moire fringes is sufficiently shortened to prevent the viewer from perceiving them. According to this structure, the angle between the two prism sheets and the pixel pattern of the transmission type LCD can be independently set within the range of 4° to 86°.

However, various problems may occur when any one of the above-described conventional illumination devices is employed as an illumination device (front light) for a reflection type LCD, as described below.

First, the illumination device disclosed in Japanese Utility Model Registration No. 3003427 is designed to illuminate objects such as drawings, pictures, or printed materials, which are usually unharmed by any moire patterns (moire fringes) emerging due to light interference. If this illumination device is employed as a front light of a reflection type LCD, light interference may occur between the optical guide member and the regular array of pixels of the reflection type LCD, thereby causing moire fringes. In the case where the optical guide member includes some periodic structure provided thereon, the colored portions (e.g., red (R), blue (B), and green (G)) of a color filter may intensify a "prism phenomenon" (under which light beams of red, green, and blue are separately perceived). As a result, the display quality may greatly deteriorate.

Furthermore, while disclosing a technique of leading light onto the object to be illuminated, the 3003427 publication fails to disclose a light controlling portion having any specific shape or structure. The shape and structure of a light controlling portion and location of a light source are important factors for realizing efficient guiding of light.

Now, the mechanism of moire fringe (stripe pattern) generation due to light interference will be briefly explained with respect to the case of employing an illumination device as a front light of a reflection type LCD.

As shown in FIG. 16, illumination light 2213 from a front light (light source) 2200 is reflected from a periodic structure (consisting of concave and convex portions) 2212 formed on an optical guide member 2211; reflected from the pixels of a reflection type LCD 2210; and allowed to pass back through the periodic structure 2212 of the optical guide member 2211. When a viewer observes the reflection type LCD 2210 against ambient light 2214, the ambient light 2214 will pass through the periodic structure 2212 of the optical guide member 2211 and will be reflected from the pixels of the reflection type LCD 2210 so as to pass back through the periodic structure 2212 of the optical guide member 2211.

The above-described structure may be considered as including three periodic patterns, namely, two periodic patterns which are defined by the two passages of light back and forth through the periodic structure 2212 of the optical guide member 2211, and one periodic pattern defined by the pixel pattern of the reflection type LCD 2210. Due to overlapping of these three periodic patterns, moire fringes may be generated.

Thus, a front light configuration, in which an optical guide member is disposed in front of a reflection type LCD, may allow moire fringes to be generated due to interference between three different periods. On the other hand, a back light configuration, in which an optical guide member is disposed behind a transmission type LCD, may allow moire fringes to be generated due to interference between two elements, i.e., the periodic structure on the optical guide member and the pixel pattern of the transmission type LCD.

Thus, the mechanism of moire fringe generation differs depending on whether the illumination device is employed as a front light for a reflection type LCD or as a back light for a transmission type LCD. Therefore, using either one of the back lights disclosed in Japanese Laid-Open Publication Nos. 6-123884 and 8-68997 as a front light for a reflection type LCD cannot effectively prevent the generation of moire fringes. Little flexibility will be provided with respect to the angular relationship between the aforementioned periodic structures.

SUMMARY OF THE INVENTION

A liquid crystal display apparatus according to the present invention includes: an illumination section having a light source and an optical guide member, and a reflection type LCD having a display region including a plurality of pixels for performing a display function, the optical guide member having first and second principal faces opposite to each other and first and second end faces opposite to each other, wherein the reflection type LCD is disposed on or above the first principal face of the optical guide member, and wherein light from the light source enters the optical guide member at the first end face, exits the optical guide member at the first principal face so as to be incident on the reflection type LCD and reflected therefrom, reenters the optical guide member at the first principal face, and exits the optical guide member at the second principal face toward a viewer.

In one embodiment of the invention, the reflection type LCD includes a plurality of color composite pixels and a color filter layer having a regular array of a plurality of color filters, each of the plurality of color composite pixels including a plurality of color pixels, each of the plurality of color pixels being defined by a corresponding one of the plurality of color filters, the plurality of color pixels having a pitch P1 along a first direction, and the plurality of color composite pixels having a pitch P2 along a second direction, the pitch P1 being smaller than the pitch P2, and the light source being disposed in the vicinity of a side of the display region extending substantially in parallel to the first direction.

In another embodiment of the invention, the light source is disposed so that the viewer is located in a direction of specular reflection to which light emitted from the illumination section is subjected at the reflection type LCD.

In another embodiment of the invention, the light source is disposed near an end of the reflection type LCD where terminals for coupling the reflection type LCD to external display circuitry are provided.

In still another embodiment of the invention, the light source is disposed in the vicinity of the first end face of the optical guide member, and a width t1 of the first end face and a width t2 of the second end face of the optical guide member substantially satisfy t1>t2.

In still another embodiment of the invention, the optical guide member includes a periodic structure formed on the second principal face, the periodic structure including propagation portions and reflection portions alternating along a third direction.

In still another embodiment of the invention, the third direction coincides with neither the first direction nor the second direction.

In still another embodiment of the invention, the third direction constitutes an angle in the range from about 10° to about 80° with respect to the second direction.

In still another embodiment of the invention, the plurality of color pixels of the reflection type LCD are arrayed in a delta arrangement; and the third direction constitutes an angle in the range from about 10° to about 25° with respect to the second direction.

In still another embodiment of the invention, the plurality of color pixels of the reflection type LCD are arrayed in a delta arrangement; and the third direction constitutes an angle in the range from about 55° to about 80° with respect to the second direction.

In still another embodiment of the invention, the plurality of color pixels of the reflection type LCD are arrayed in a stripe arrangement; and the third direction constitutes an angle in the range from about 15° to about 75° with respect to the second direction.

In still another embodiment of the invention, the optical guide member includes an antireflection element provided on the first principal face.

In still another embodiment of the invention, an effective emission length L3 of the light source and a length L4 of a side of the first principal face of the optical guide member that extends substantially in parallel with the effective emission length L3 of the light source substantially satisfy:

$$0 \leq (L3 - L4) \leq 30 \text{ mm}.$$

In still another embodiment of the invention, a vertical length L1 of the display region of the reflection type LCD and a length L2 of a side of the first principal face of the optical guide member that extends substantially perpendicularly to the effective emission length L3 of the light source substantially satisfy:

$$0 \leq (L2-L1) \leq 30 \text{ mm}.$$

In still another embodiment of the invention, a light shielding member is disposed corresponding to a connection or transition portion between the optical guide member and the light source.

In another aspect of the invention, there is provided an electronic device incorporating any one of the above liquid crystal display apparatuses.

The present specification employs the following terminology regarding various physical orientations:

As seen from a viewer observing a display screen (or a display region) of a liquid crystal display device from a position that allows the most conventional viewing of the display screen, a direction corresponding to the 12 o'clock direction is defined as the "upper direction"; and a direction corresponding to the 6 o'clock direction is defined as the "lower direction". Furthermore, the direction extending along the 9 o'clock direction and the 3 o'clock direction is defined as the "horizontal direction" of the display region; and the direction extending along the 12 o'clock direction and the 6 o'clock direction is defined as the "vertical direction" of the display region. In FIGS. 14A and 14B, for example, arrows 42 and 44 represent the "upper direction" and the "lower direction", respectively, of display regions 101 and 701. The outgoing light directed toward the viewer is defined as the "specular reflection direction."

The "front" or "front face" of a reflection type LCD is defined as any surface of the reflection type LCD facing a viewer. In FIG. 1B, for example, a face 46 defines the front face of a reflection type LCD 101.

An "end" or "end portion" is defined as a portion formed along the periphery of a display region of a liquid crystal display device that does not substantially contribute to the display function of the liquid crystal display device. In FIG. 1A, for example, a liquid crystal display device 101 has an end portion 103.

A liquid crystal display device according to the present invention includes an illumination section having a light source and an optical guide member, and a reflection type LCD having a display region including a plurality of pixels for performing a display function. The optical guide member includes first and second principal faces opposite to each other, and first and second end faces opposite to each other. The reflection type LCD is disposed on or above the first principal face of the optical guide member, so that the light from the light source enters the optical guide member at its first end face, exits the optical guide member at its first principal face so as to be incident on the reflection type LCD and reflected therefrom, reenters the optical guide member at its first principal face, and exits the optical guide member at its second principal face so as to reach the eyes of a viewer. As a result, the light from the light source can be effectively guided to the reflection type LCD even in a dark environment, so that a clear displayed image can be observed. In a relatively bright environment, a clear displayed image can be observed by utilizing ambient light, without utilizing the light from the light source.

In one embodiment, the reflection type LCD includes a plurality of color composite pixels and a color filter layer having a regular array of a plurality of color filters. Each of the plurality of color composite pixels includes a plurality of color pixels. Each of the plurality of color pixels is defined by a corresponding one of the plurality of color filters, where the plurality of color pixels have a pitch P1 along a first direction, and the plurality of color composite pixels have a pitch P2 along a second direction, the pitch P1 being smaller than the pitch P2. The light source is disposed in the vicinity of the side of the display region extending substantially in parallel to the first direction. As a result, the light emitted from the light source travels along a longer period, i.e., the pitch P2 of the color composite pixels which is longer than the period P1 of the color pixels (e.g., including pixels of red (R), green (G), and blue (B)). Thus, a longer interference period is realized, whereby the density of moire fringes is reduced.

In this connection, it is possible to adopt either a stripe arrangement (FIG. 11) or a delta arrangement (FIG. 12), which are representative structures for periodically arrayed color pixels of an LCD. In a stripe arrangement shown in FIG. 11 where each color pixel of R, G, or B is defined as one third of a square region (and which collectively constitute one full color composite pixel), the color pixels are arrayed with a pitch of P along the horizontal direction and a pitch of 3P along the vertical direction. In a delta arrangement shown in FIG. 12 where each R, G, or B color pixel is defined as a rectangular region, the color pixels are arrayed with a pitch of P along the horizontal direction and a pitch of approximately 2P along the vertical direction.

In the stripe arrangement or delta arrangement, the R, G, and B color pixels are periodically formed along the horizontal direction of the display screen, whereas a periodic structure which is equivalent to about two to three times the horizontal dimension of each color pixel is formed along the vertical direction. Thus, by disposing the light source so that the light emitted from the light source travels along the longer pitch of the color pixels, it becomes possible to reduce the density of moire fringes (occurring due to interference between an image created by the light exiting the optical guide member and the periodic structure defined by the color pixels), thereby improving the display quality of the liquid crystal display apparatus.

In another embodiment, the light source included in the illumination section is disposed so that the viewer is located in a direction of specular reflection of the illumination light (i.e., light emitted from the illumination section) occurring at the reflection type LCD. In other words, the light source is disposed at the upper end of the display region of the reflection type LCD. As a result, the light exiting the optical guide member can be effectively propagated to the viewer.

By disposing the light source near an end of the reflection type LCD where terminals for coupling the reflection type LCD to external display circuitry are provided, greater convenience is provided in an application where the liquid crystal display apparatus is incorporated in an electronic device or the like. The reason is that, since portable electronic information devices are generally required to have a very narrow display region for improved portability, the wiring leads for the driving circuitry and the like of the liquid crystal display apparatus must often be accommodated in a space near the end of the display screen where terminals for coupling the LCD to external display circuitry are provided. Thus, by disposing the light source near such an end of the reflection type LCD where terminals for coupling the LCD to external display circuitry are provided and at a frontal position (i.e., so as to be between the viewer and the reflection type LCD), this space can be conveniently used for accommodating the light source and the like . As a result, it becomes possible to design the liquid crystal display apparatus so as to have a very narrow configuration and improve the portability of the electronic device incorporating such a liquid crystal display apparatus.

In another embodiment, a width t1 of the first end face and a width t2 of the second end face of the optical guide member satisfy t1>t2. As a result, it becomes possible to reduce angle θ 1 (FIG. 13) of the outgoing light from the optical guide member with respect to a normal axis 20 of the outgoing face (i.e., first principal face) of the optical guide member, thereby enabling efficient guiding of the light from the light source to an object to be illuminated.

In another embodiment, the optical guide member includes a periodic structure formed on its second principal face, the periodic structure including propagation portions and reflection portions alternating along a third direction. As a result, the light from the light source is propagated through the propagation portions, and the incident light is subjected to total reflection at the reflection portions. Consequently, the light exiting the optical guide member at the outgoing face (i.e., the first principal face) can be brought closer to the normal axis of the first principal face. Thus, the outgoing light can have a uniform luminance distribution, while reducing the amount of light (leak light) exiting the optical guide member at the second principal face toward the viewer, so that the light from the light source is efficiently guided to an object to be illuminated, i.e., the reflection type LCD.

By ensuring that the third direction coincides with neither the first direction nor the second direction, it becomes possible to prevent a prismatic action occurring between the periodic structure formed on the optical guide member and a color filter, whereby the display quality is improved.

Specifically, the inventors have found out that, in the case where the direction along which the color pixels of the reflection type LCD are arrayed coincides with the direction of the periods of the periodic structure (e.g., grooves) on the optical guide member, a viewer is likely to observe moire fringes in a prismatic state (due to interference between the periodic structure on the optical guide member and the array of color pixels of the reflection type LCD), whereby the display quality is degraded. This is because the color pixels or layer portions of the same color coincide for one periodic portion. Therefore, by ensuring that the direction along which the color pixels of the reflection type LCD are arrayed does not coincide with the direction of the periods of the periodic structure on the optical guide member, the probability of the color pixels or layer portions of the same color coinciding for one periodic portion is decreased. As a result, any prismatic action can be prevented from occurring when a viewer observes the pixels of the reflection type LCD through the periodic structure on the optical guide member, whereby the display quality is improved.

By ensuring that the third direction constitutes an angle in the range from about 10° to 80° with respect to the second direction, it becomes possible to prevent moire fringes from being generated due to interference between the periodic structure on the optical guide member, the pattern of the color pixels of the reflection type LCD, and again the periodic structure on the optical guide member.

In another embodiment, arraying the color pixels of the reflection type LCD in a delta arrangement and ensuring that the third direction constitutes an angle in the range from about 10° to about 25° or in the range from about 55° to about 80° with respect to the second direction is particularly effective for the prevention of moire fringe generation.

In another embodiment, arraying the color pixels of the reflection type LCD in a stripe arrangement and ensuring that the third direction constitutes an angle in the range from about 15° to about 75° with respect to the second direction is particularly effective for the prevention of moire fringe generation.

By providing an antireflection element provided on the first principal face of the optical guide member, it becomes possible to reduce the light reflected at the first principal face (i.e., the surface facing the object to be illuminated) of the optical guide member to about 4% or less. As a result, it becomes possible to minimize the generation of fringes (i.e., undulation of relatively bright portions and relatively dark portions) due to the interference between the light from the light source having been subjected to total reflection from the second principal face of the optical guide member (i.e., a light source image) and the light reflected from the first principal face of the optical guide member (i.e., a reflection image).

By ensuring that an effective emission length L3 of the light source and a length L4 of a side of the first end face of the optical guide member that extends substantially in parallel with the effective emission length L3 of the light source substantially satisfy $0 \leq (L3-L4) \leq 30$ mm, it becomes possible to allow the light from the light source to enter efficiently the optical guide member, and provide greater advantages in an application where the liquid crystal display apparatus is incorporated in an electronic device.

By ensuring that a vertical length L1 of the display region of the reflection type LCD and a length L2 of the side of the first principal face of the optical guide member that extends substantially perpendicularly to the effective emission length L3 of the light source substantially satisfy $0 \leq (L2-L1) \leq 30$ mm, it becomes possible to allow the light from the light source to efficiently enter the optical guide member, and provide greater advantages in an application where the liquid crystal display apparatus is incorporated in an electronic device.

By disposing a light shielding member corresponding to a connection or transition portion between the optical guide member and the light source, it becomes possible to shield the leak light from the light source from directly reaching the viewer, thereby improving the display quality.

An electronic device incorporating the above-described liquid crystal display will provide excellent portability with low power consumption and improved visibility and facility of user operation in dark places.

Thus, the invention described herein makes possible the advantages of (1) providing a liquid crystal display apparatus with excellent portability and low power consumption, in which an illumination device is employed as a front light for a reflection type LCD, while preventing the generation of moire fringes and improving the display quality; and (2) providing an electronic device incorporating such a liquid crystal display apparatus.

These and other advantages of the present invention will become apparent to those skilled in the art upon reading and understanding the following detailed description with reference to the accompanying figures.

BRIEF DESCRIPTION OF THE DRAWINGS

FIGS. 2A to 2C illustrate the structure of a reflection type LCD incorporated in a portable electronic information device according to Example 1 of the present invention.

FIGS. 9A to 9C illustrate the structure of an optical guide member employed in Example 2 of the present invention.

FIG. 10 is a graph illustrating the angular characteristics between leak light and outgoing light from the optical guide member employed in Example 2 of the present invention.

FIG. 15 is a table illustrating the relationship between the tilt angle of an optical guide member and outgoing light in a front light configuration.

DESCRIPTION OF THE PREFERRED EMBODIMENTS

Hereinafter, the present invention will be described by way of examples, with reference to the accompanying figures.

EXAMPLE 1

Figure 1A:
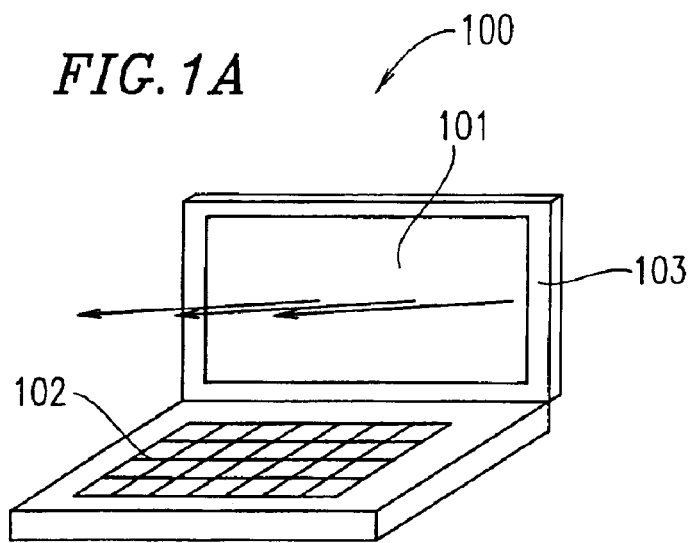
FIG. 1A is a schematic diagram illustrating a portable electronic information device according to Example 1 of the present invention.

Example 1 of the present invention will be described with reference to FIGS. 1A, 1B to 7 and FIGS. 11 to 15. An electronic device 100 of Example 1 shown in FIG. 1A, which may be a portable information device or the like, includes a liquid crystal display apparatus 101 and an operation section 102.

The liquid crystal display apparatus 101 includes an illumination section and a reflection type LCD 200 (FIGS. 2A to 2C). The illumination section includes a light source 105 and an optical guide member 104. The reflection type LCD 200 includes a display region including a plurality of pixels for performing a display function. The reflection type LCD 200 is disposed on or above a first principal face 10 of the optical guide member 104 included in the illumination section. Light from the light source 105 enters the optical guide member 104 through a first end face 14 of the optical guide member 104, as indicated by the arrows in FIG. 1B, and goes out at the first principal face 10 of the optical guide member 104 so as to enter the reflection type LCD 200. The light reflected from the reflection type LCD 200 goes out at a second principal face 12 of the optical guide member 104 so as to travel toward the viewer.

Figure 1B:
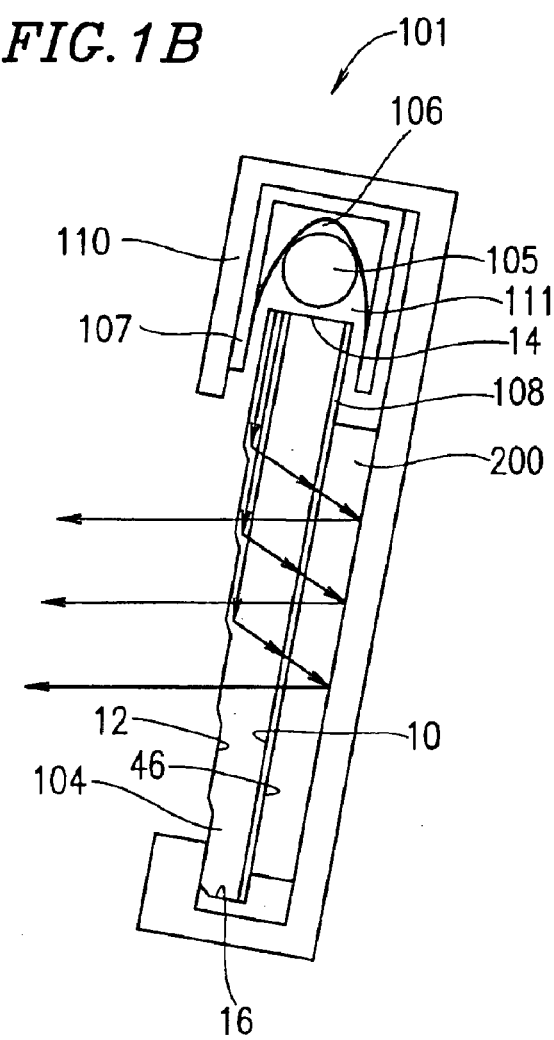
FIG. 1B is a cross-sectional diagram illustrating a liquid crystal display apparatus incorporated in the portable electronic information device shown in FIG. 1A.

As the light source 105, a cold cathode fluorescent tube (hereinafter referred to as a "CCFT") may be employed, for example. As shown in FIG. 1B, an diffusion reflection sheet 106 is provided in the vicinity of the light source 105; a light shielding member 107 is disposed corresponding to a connection or transition portion 111 between the optical guide member 104 and the light source 105; and an antireflection film 108 is provided on the first principal face 10 of the optical guide member 104. The light shielding member 107 may be formed of a black resin so as to-double as a holder for the CCFT.

By employing a light shielding member 107 formed of a black resin, it becomes possible to prevent the light from the light source 105 from directly reaching the eyes of a viewer.

Although the structure shown in FIG. 1B employs the light shielding member 107 to shield the light from the light source 105 so as not to reach the viewer, it is also applicable to employ a housing 110 of the electronic information device, thereby reducing the number of component elements and hence the production cost.

As the antireflection film 108, a film composed essentially of a triacetylcellulose (TAC) substrate with an antireflection coating provide thereon may be used, for example.

For example, the antireflection film 108 may be composed essentially of a TAC film with an antireflection layer laminated thereon, the antireflection layer including a first layer of $MgF_2$, a second layer of $CeF_3$, a third layer of $TiO_2$, and a fourth layer of $MgF_2$.

For example, such a TAC film may have a refractive index $n_t$ of about 1.51 and a thickness of about 100 $\mu$m; the first $MgF_2$ layer may have a refractive index $n_m$ of about 1.38 and a thickness of about 100 nm; the second $CeF_3$ layer may have a refractive index $n_c$ of about 2.30 and a thickness of about 120 nm; the third $TiO_2$ layer may have a refractive index $n_{ti}$ of about 1.63 and a thickness of about 120 nm, and the fourth $MgF_2$ layer may have a refractive index $n_m$ of about 1.38 and a thickness of about 100 nm. The first through fourth layers can be sequentially formed on the TAC film by, for example, vacuum deposition.

The antireflection film 108 having the exemplary lamination structure above is designed so that the first layer provides a phase difference of $\lambda/4$; the second layer provides a phase difference of $\lambda/2$; the third layer provides a phase difference of $\lambda/4$; and the fourth layer provides a phase difference of $\lambda/4$ with respect to light having a wavelength of about 550 nm. As a result, the antireflection film 108 can function as an antireflection film over a broad band of wavelengths. In accordance with the antireflection film 108 of the present example, the reflectance for incident light entering the film from the air can be reduced to 0.4%.

The antireflection film 108 can be adhered to the optical guide member 104 by using an acrylic type adhesive resin so that the refractive index of the antireflection film 108 is matched with the refractive index of the optical guide member 104. In general, in the case where the refractive index n of a layer of adhesive resin (thickness: about 20 $\mu$m) formed on the antireflection film 108 and the refractive index $n_d$ of the optical guide member 104 have a large difference $(n-n_d)$, the surface reflection at the boundary therebetween increases so that the leakage light exiting the optical guide member surface increases. As a result the contrast of the display screen may deteriorate. In order to prevent this, it is necessary to prescribe the refractive index n of the adhesive resin layer and the refractive index $n_d$ of the optical guide member 104 so as to be substantially equal to each other. Accordingly, it is preferable to minimize the surface reflection at the boundary between the two layers to 0.5% or less by ensuring $0 \leq (n-n_d) \leq 0.2$.

In the present example, the two refractive indices are substantially matched by prescribing the refractive index n of the adhesive resin layer as 1.51 and the refractive index $n_d$ of the optical guide member 105 as 1.49.

As illustrated in FIG. 1B, by providing an antireflection means (e.g., the antireflection film 108) on the first principal face 10 of the optical guide member 104, it becomes possible to minimize the generation of fringes (i.e., an undulation of relatively bright portions and relatively dark portions) due to the interference between a total reflection image of the light source 105 emerging on the second principal face 12 of the optical guide member 104 and a reflection image emerging on the first principal face 10 of the optical guide member 104.

Although the antireflection means is implemented as the antireflection film 108 which is adhered to the optical guide member 104 in the manner shown in FIG. 1B in the present example, the antireflection film 108 may be formed directly on the optical guide member 104. In that case, it becomes possible to prevent expansion or contraction due to differential thermal expansion coefficients of the optical guide member material and the film material, although such a configuration will be susceptible to some temperature constraints during the formation of the antireflection layer.

The illumination section and the display region of a portable electronic information device can be constructed as shown in FIG. 1B, where the illumination section is disposed in front of the reflection type LCD 200 so that the light source 105 is located at an upper end of a display region, with the housing 110 providing appropriate enclosure.

Figure 5:
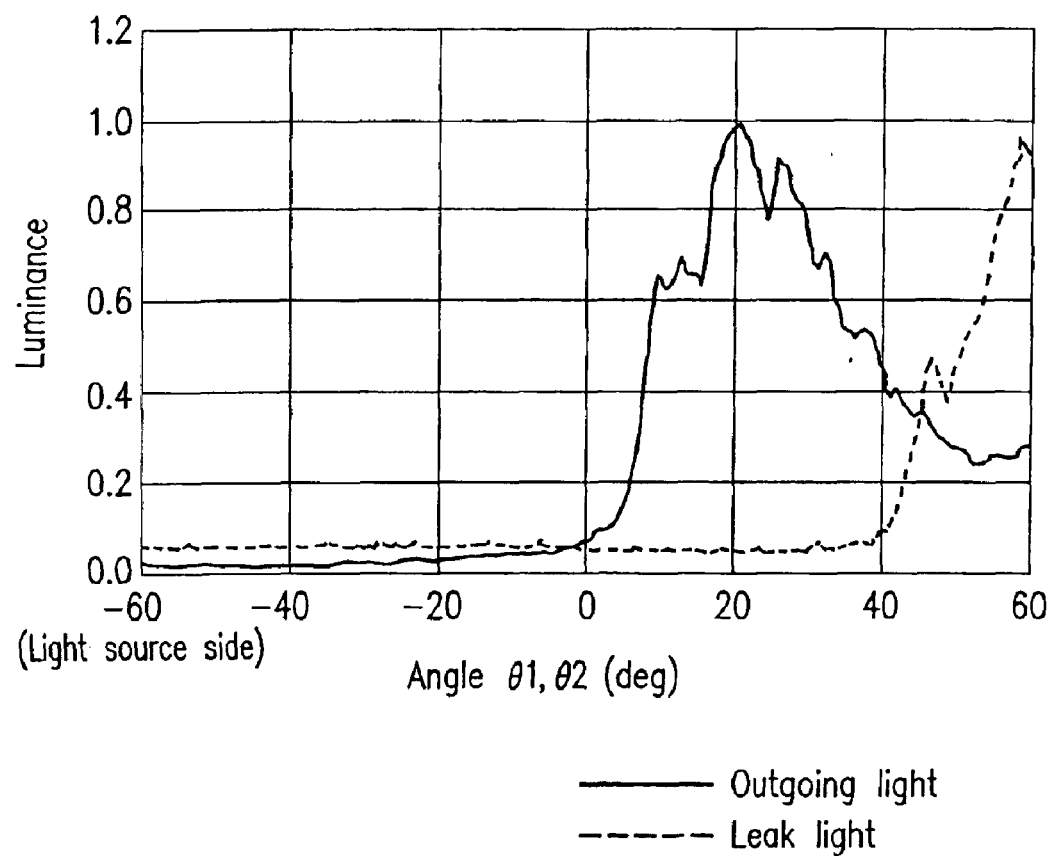
FIG. 5 is a graph illustrating the angular relationship between leak light and outgoing light from the optical guide member employed in Example 1 of the present invention.
Figure 13:
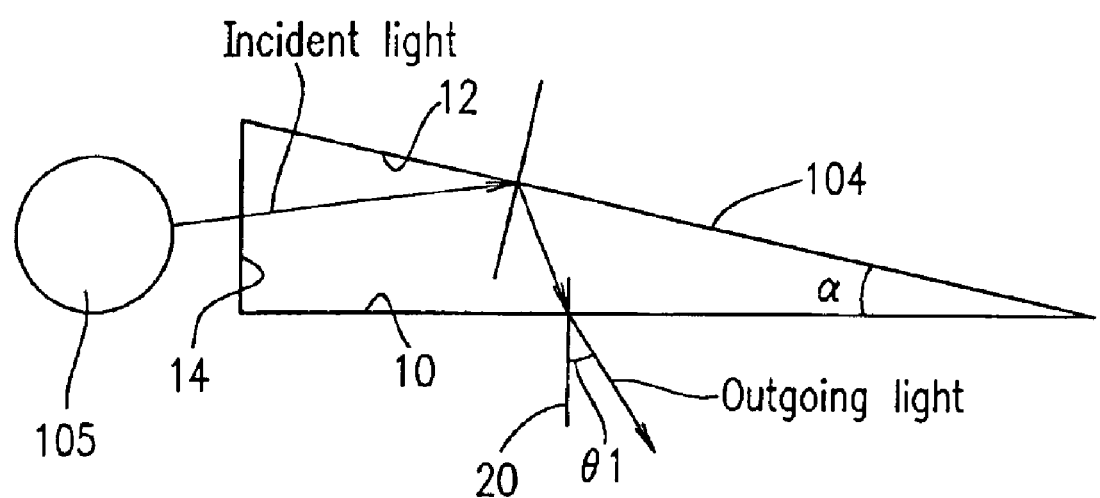
FIG. 13 is a schematic diagram illustrating the optical path of outgoing light from an optical guide member in a front light configuration.

It is preferable that, as shown in FIG. 1B, the illumination section is disposed so that the viewer is located in the direction of specular reflection of the illumination light (i.e., light emitted from the light source 105) occurring at the reflection type LCD 200 (i.e., so that the illumination section is disposed at the upper end of the display region of the reflection type LCD 200 in this case). As shown in FIG. 13, the optical guide member 104 subjects the light entering from the light source 105 to total reflection on the second principal face 12 (which is opposite to the outgoing (i.e., first principal) face 10 of the optical guide member 104), and refracts a portion of the totally reflected light at the outgoing (i.e., first principal) face 10 of the optical guide member 104 by failing to satisfy the conditions of total reflection. Thus, the outgoing light is extracted so as to illuminate the reflection type LCD 200. As shown in FIG. 5, the outgoing light exiting the optical guide member 104 has an intensity peak in a direction of angle θ 1 (FIG. 13) with respect to a normal axis 20 of the first principal face 10 of the optical guide member 104.

Figure 14A:
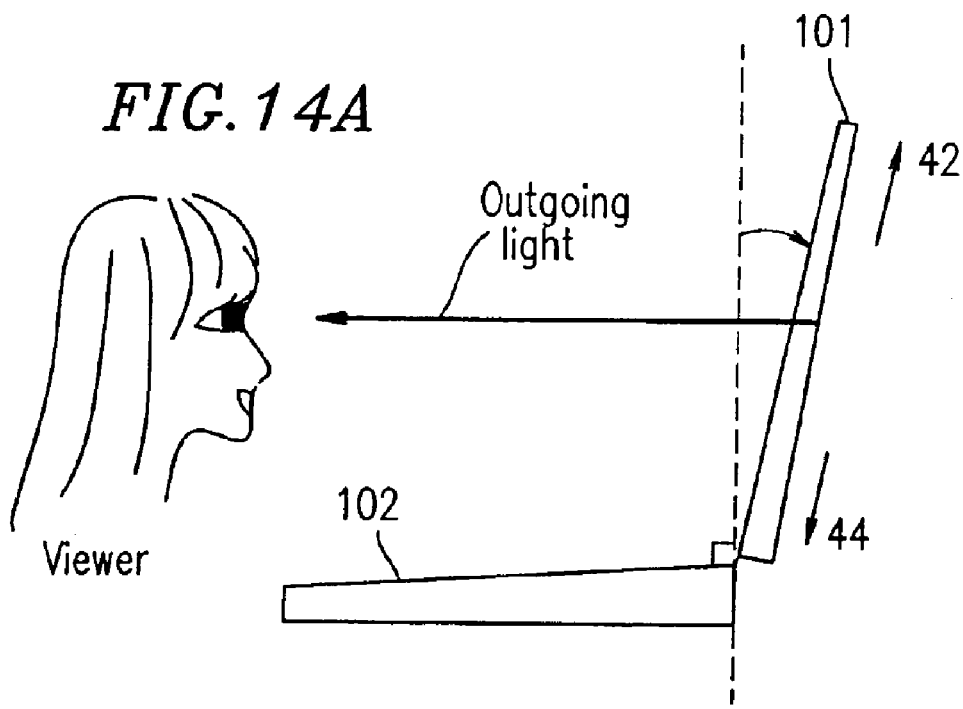
FIGS. 14A and 14B are diagrams showing the relative positions of a display region of a portable electronic information device and a viewer.
Figure 14B:
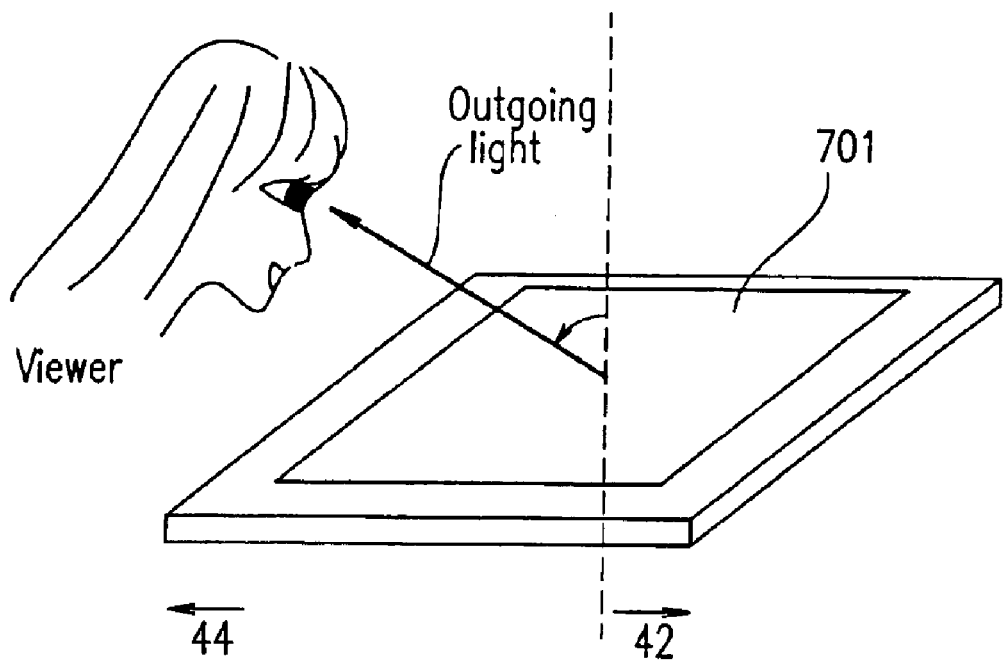
Figure 16:
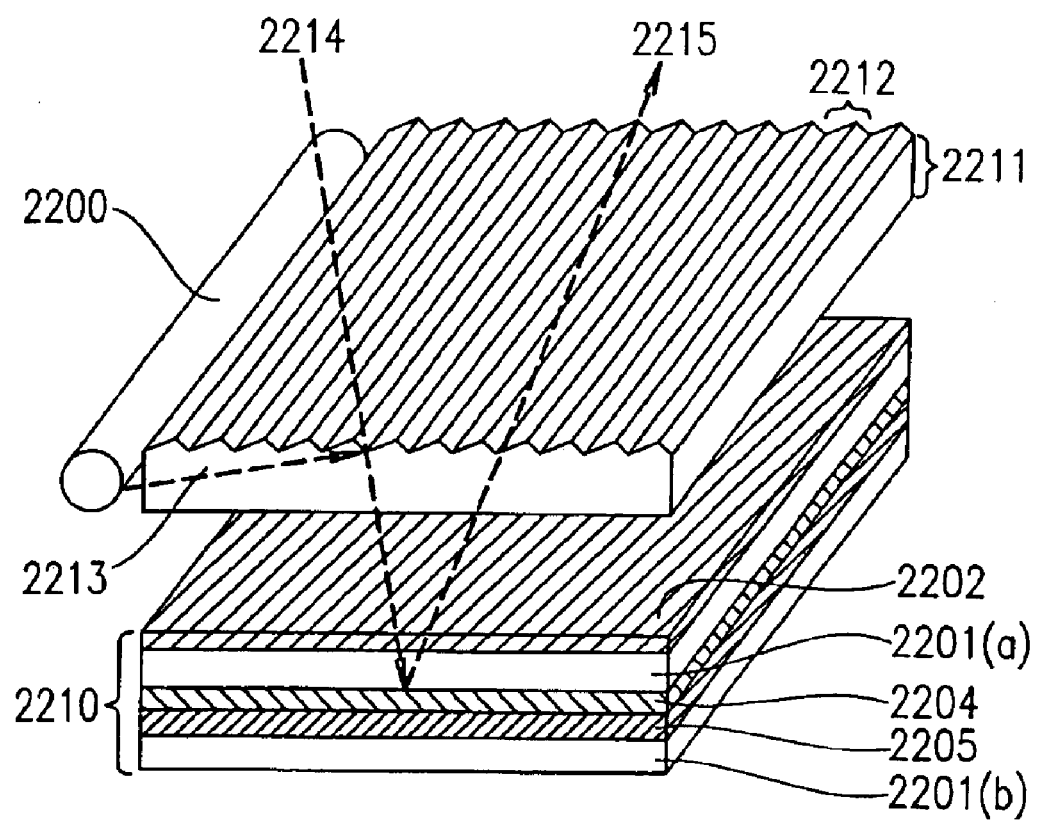
FIG. 16 is a perspective view illustrating the mechanism of moire fringe generation in a reflection type LCD provided with a front light.

The display region (display screen) of the liquid crystal display apparatus for use in a portable electronic information device and the like may be conveniently tilted away from the viewer along the line of sight (as shown in FIG. 14A). Alternatively, the display screen itself may be placed on a desk, etc., so that the viewer can observe the display screen in a lower direction (as shown in FIG. 14B; described in Example 2 in more detail). The outgoing light which exits the optical guide member 104 at an angle of θ 1 with respect to the normal axis 20 can be effectively propagated to the viewer by disposing the illumination section so that the light source 105 is located in an upper direction of the display screen of the reflection type LCD 200 (i.e., so that the viewer is located in the direction of specular reflection of the illumination light from the light source 105 as reflected by the reflection type LCD 200).

Next, the structure of the reflection type LCD 200 according to the present example of the invention will be described in detail with reference to FIGS. 2A to 2C. According to Example 1, a liquid crystal display device having a diagonal dimension of 11.3 inches (vertical length L1: 172.2 mm; horizontal length L4: 229.6 mm) is used as the reflection type LCD 200, for example. The reflection type LCD 200 includes a counter glass substrate 201(a) and a TFT substrate 201(b) having driving circuitry or the like formed thereon. The display region 203 of the reflection type LCD 200 is smaller than the outer dimensions of the reflection type LCD 200.

As shown in FIG. 2C, the reflection type LCD 200 includes, for example, a polarization plate 202, the counter glass substrate 201(a), and the TFT substrate 201(b) having TFTs (thin film transistors) formed thereon, with a color filter layer 206, a liquid crystal layer 204, and reflection electrodes 205 interposed between the counter glass substrate 201(a) and the TFT substrate 201(b). The reflection electrodes 205 on the TFT substrate 201(b) are in contact with the liquid crystal layer 204. Light entering the reflection type LCD 200 is subjected to diffuse reflection by a plurality of convex and concave portions formed on the surface of the reflection electrode 205.

The convex and concave portions on the surface of the reflection electrode 205 are dimensioned so as not to substantially affect the cell thickness defined by the liquid crystal layer 204. By thus forming the reflection electrodes 205 within the LCD 200, it becomes possible to minimize double imaging due to parallax.

As used herein, "color composite pixels", "color pixels", and "color filters" are defined as follows:

A color liquid crystal display apparatus includes a plurality of color composite pixels, each color composite pixel typically including three primary color pixels (red, green, and blue pixels). The color pixels can be arrayed in a delta arrangement or a stripe arrangement, for example. Each color pixel is defined by a pixel electrode and an associated color filter.

For example, a red pixel is constituted by a pixel electrode and a red filter. A plurality of red filters form a red filter layer. A red filter layer, a green filter layer, and a blue filter layer are collectively referred to as a "color filter layer". A color filter layer may include light shielding layers between the respective color filters. A plurality of such light shielding layers constitute a black matrix.

Figure 11:
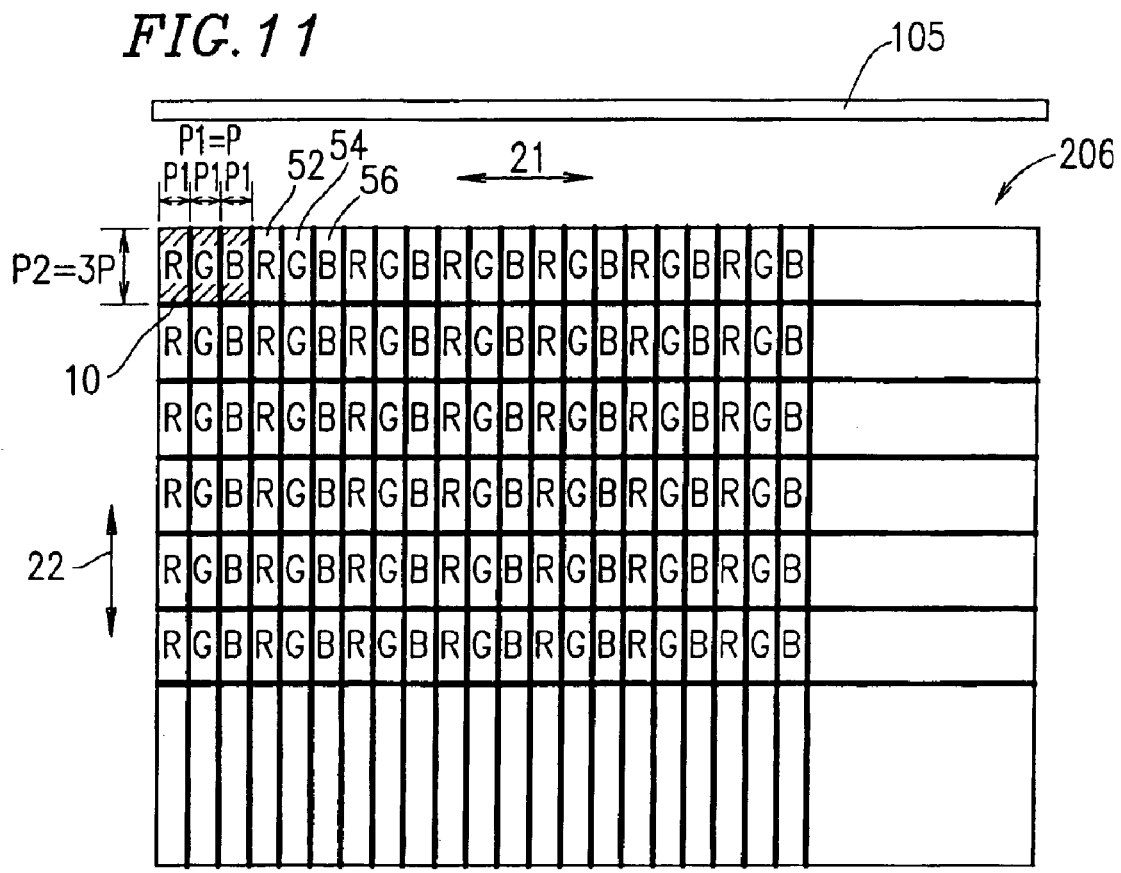
FIG. 11 is a diagram illustrating a pixel pattern of a liquid crystal display apparatus in a stripe arrangement.

The counter glass substrate 201(a) includes, for example, a color filter layer 206 including a plurality of color filters of red (52), green (54), and blue (56), as well as transparent counter electrodes 207. As shown in FIG. 11, for example, the color filter layer 206 may include a regular stripe array of color filters (red filters (52), green filters (54), and blue filters (56)), so that color pixels (each defined by a pixel electrode and an associated color filter) are formed in a regular stripe array.

The color pixels are provided with a pitch P1 of about 0.096 mm along the horizontal direction (or a first direction 21 in FIG. 11) on the display region. The color composite pixels are provided with a pitch P2 of about 0.288 mm along the vertical direction (or a second direction 22 in FIG. 11) on the display region. In other words, P2=3P1. Thus, a pitch P1 of the color pixels along the horizontal direction 21 is smaller than a pitch P2 of the color composite pixels along the vertical direction 22. It is preferable that the light source 105 is disposed in the vicinity of a side which is substantially parallel to the first direction 21 of the display region.

Figure 3:
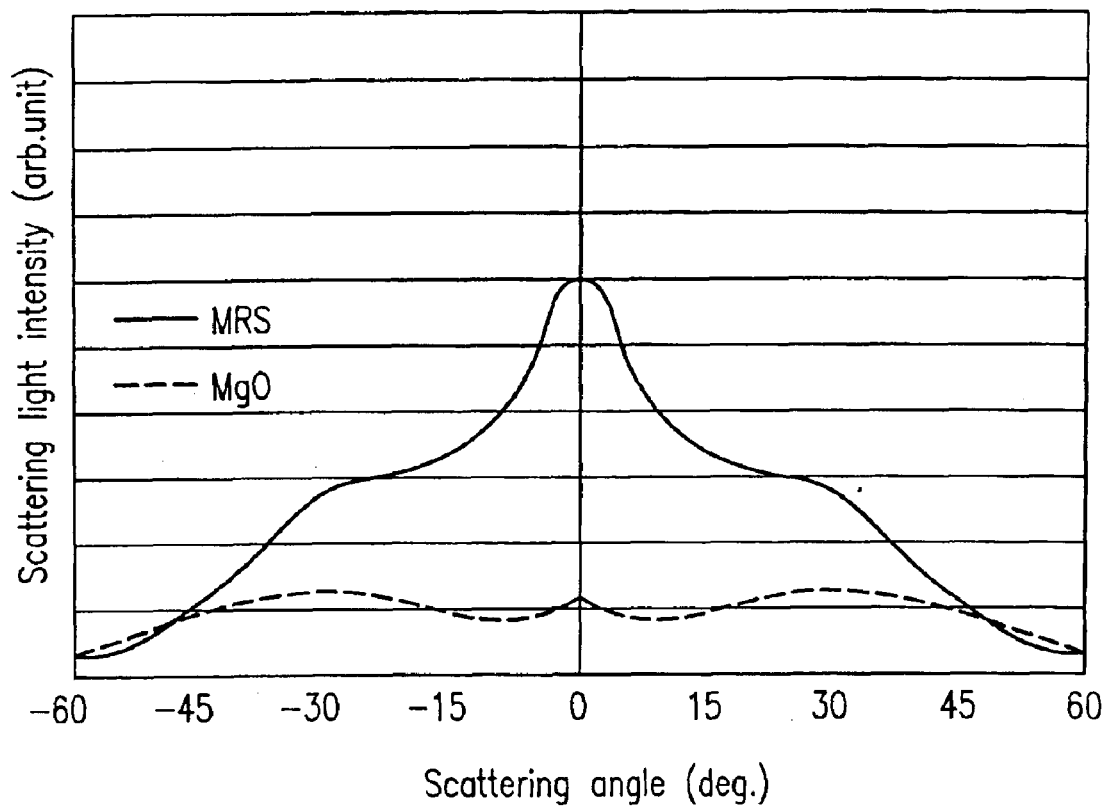
FIG. 3 is a graph illustrating the reflection characteristics of reflection electrodes included in the liquid crystal display apparatus according to Example 1 of the present invention.

FIG. 3 illustrates the reflection characteristics of the reflection electrodes 205 of an MRS (micro reflective structure) type, which can be incorporated in the reflection type LCD 200, and a reference scattering plate (MgO). FIG. 3 shows an intensity distribution of reflected light with respect to a reflection angle of the illumination light entering at about 30° from the normal axis of the plane of each reflection electrode 205. From FIG. 3, it can be seen that the reflection electrodes 205 exhibit some directionality as compared to the reference scattering plate, and that the reflection electrodes 205 are capable of diffusing the diffused light (illumination light) about ±30° from the direction of specular reflection (i.e., 0° in FIG. 3), thereby expanding the viewing angle characteristics when the display is observed by a viewer.

Next, the optical guide member 104 employed in the present example (FIG. 1B) will be described in detail with reference to FIG. 4. For example, the optical guide member 104 is constructed of an acrylic resin having a refractive index of 1.52 and a CCFT (supra) is provided as the light source 105, the CCFT having an effective emission length L3=230 mm. The effective emission length L3 of the CCFT is greater than a horizontal length L4 of the optical guide member 104 (i.e., the length of a side of the first principal face 10 of the optical guide member 104 that extends substantially in parallel with the effective emission length L3 of the light source 105); i.e., L3>L4. For example, L4 can be about 229.6 mm. In accordance with such a configuration, the incident light can sufficiently enter the optical guide member 104.

The effective emission length L3 of the CCFT, as used in the present specification, is defined as the length of a region which provides up to about 0.7 times the luminance of a central portion of the CCFT.

In addition, a vertical length L2 of the optical guide member 104 (i.e., the length of a side of the first principal face 10 of the optical guide member 104 that extends substantially perpendicularly to L4 or L3) is greater than the vertical length L1 (=172.2 mm) of the display region of the LCD 200 (i.e., L2>L1). For example, L2 can be about 180 mm. In accordance with such a configuration, the outgoing light 405 which exits the optical guide member 104 at the first principal face 10 in a plane-like or omnidirectional manner can be effectively utilized for display.

Although allowing light to be guided into the display region with enhanced efficiency, selecting the effective emission length L3 of the CCFT to be greater than the horizontal length L4 (i.e., L3>L4) and/or the vertical length L2 of the optical guide member 104 to be greater than the vertical length L1 (i.e., L2>L1) may result in an increased overall size of an electronic device incorporating the liquid crystal display apparatus of the invention. Hence, for the sake of portability of such electronic devices, it is preferable that the respective dimensions substantially satisfy $0 \leq (L3-L4) \leq 30$ mm and $0 \leq (L2-L1) \leq 30$ mm.

The optical guide member 104 in the present example is formed so that, for example, the first end face 14 of the optical guide member 104 has a width t1 of 2 mm and that a second end face 16 (opposite to the first end face 14) has a width t2 of 1 mm, thereby defining a wedge-like cross section along the direction perpendicular to the effective emission length L3.

It should be noted that the width t1 of the first end face 14 of the optical guide member 104 is defined as the length of either one of the shorter sides of the generally rectangular first end face 14 of the optical guide member 104. Similarly, the width t2 of the second end face 16 opposite to the first end face 14 is defined as the length of either one of the shorter sides of the generally rectangular second end face 16 of the optical guide member 104.

Prism portions 403 are formed on the second principal face 12 of the optical guide member 104 such that propagation portions (flat portions) 403(a) and reflection portions (slope portions) 403(b) alternate along a third direction 23, thereby defining a periodic structure. The propagation portions 403(a) have a width X of about 0.38 mm, and the reflection portions 403(b) have a width Y of about 0.02 mm, for example. The tilt angle α of the slope portions 403(b) can be about 35°, for example.

FIG. 15 illustrates the relationship between the tilt angle α of the slope portions 403(b) of the optical guide member 104 (formed by varying the thickness of the optical guide member 104) and the outgoing angle θ 1 of the outgoing light (FIG. 13). As seen from FIG. 15, the angle θ 1 of the outgoing light can be reduced (i.e., so as to become closer to the normal axis direction of the plane of the optical guide member 104) by increasing the tilt angle α of the slope portions 403(b), whereby the illumination light can be efficiently guided to the reflection type LCD 200 to be illuminated.

By thus forming the optical guide member 104 in a wedge-like shape with the plurality of prism portions 403 (including a plurality of propagation portions 403(a) and reflection portions 403(b)), the outgoing light exiting the second principal face 12 of the optical guide member 104 can be reduced while being able to convert incident light 406 from the light source 105 provided at a first end face 14 of the optical guide member 104 into the generally planar outgoing light 405, thereby providing uniform illumination for the LCD 200.

FIG. 5 illustrates the characteristics of leak light 407 and the outgoing light 405 (FIG. 4) from the optical guide member 104 according to Example 1. Specifically, FIG. 5 shows normalized values (i.e., so that maximum values will become 1) of the luminance of the outgoing light 405 exiting the outgoing face (i.e., the first principal face) 10 of the optical guide member 104 at angle θ 1 (FIGS. 4 and 13) with respect to the normal axis 20, and the luminance of the leak light 407 leaking from the second principal face 12 of the optical guide member 104 at an angle θ 2 the with respect to the normal axis 20. As seen from FIG. 5, there is substantially no leak light 407 from the optical guide member 104 to the viewer (in the 0° direction with respect to the normal axis 20 of the plane of the optical guide member 104). Thus, light can effectively exit the outgoing face 10 of the optical guide member 104 at θ 1 in the range from 0° to 20°. As a result, good matching is attained with respect to the reflection electrodes 205 incorporated in the reflection type LCD 200, and efficient illumination is realized, thereby minimizing a decrease in display contrast.

By disposing the light source 105 in the upper direction of the display region of the reflection type LCD 200, it becomes possible to utilize the leak light 407 at θ 2 of 40° or more (which cannot be efficiently utilized for display and sufficiently strike the eyes of the viewer) for illuminating the operation section 102 (FIG. 1A) of the electronic information device.

It is preferable that the third direction 23, along which the plurality of propagation portions 403(a) and the plurality of reflection portions 403(b) are periodically provided on the second principal face 12 of the optical guide member 104, does not coincide with either the first direction 21 (i.e., the direction of the pitch P1 of the color pixels, along which the color pixels of the reflection type LCD 200 are arrayed) or the second direction 22 (i.e., the direction of the pitch P2 of the color composite pixels such that P1<P2).

In the present example, the prism portions 403 on the optical guide member 104 are formed so as to constitute an angle θ 3 (FIG. 4) of about 20°, with respect to the first direction 21 (i.e., the direction along which the color pixels of the reflection type LCD 200 are arrayed). The angle θ 3 is equal to the angle between the third direction 23 (along which the prism portions 403 are periodically provided) and the second direction 22 (i.e., the direction of the pitch P2 of the color composite pixels). By retaining a certain angle θ 3 between the periodic structure defined by the prism portions 403 on the optical guide member 104 and the periodic structure defined by the color pixels included in the LCD 200, it becomes possible to prevent the generation of moire fringes due to interference between the periodic structure provided by the optical guide member 104, the pattern of the color pixels, and again the periodic structure provided by the optical guide member 104.

Figure 4:
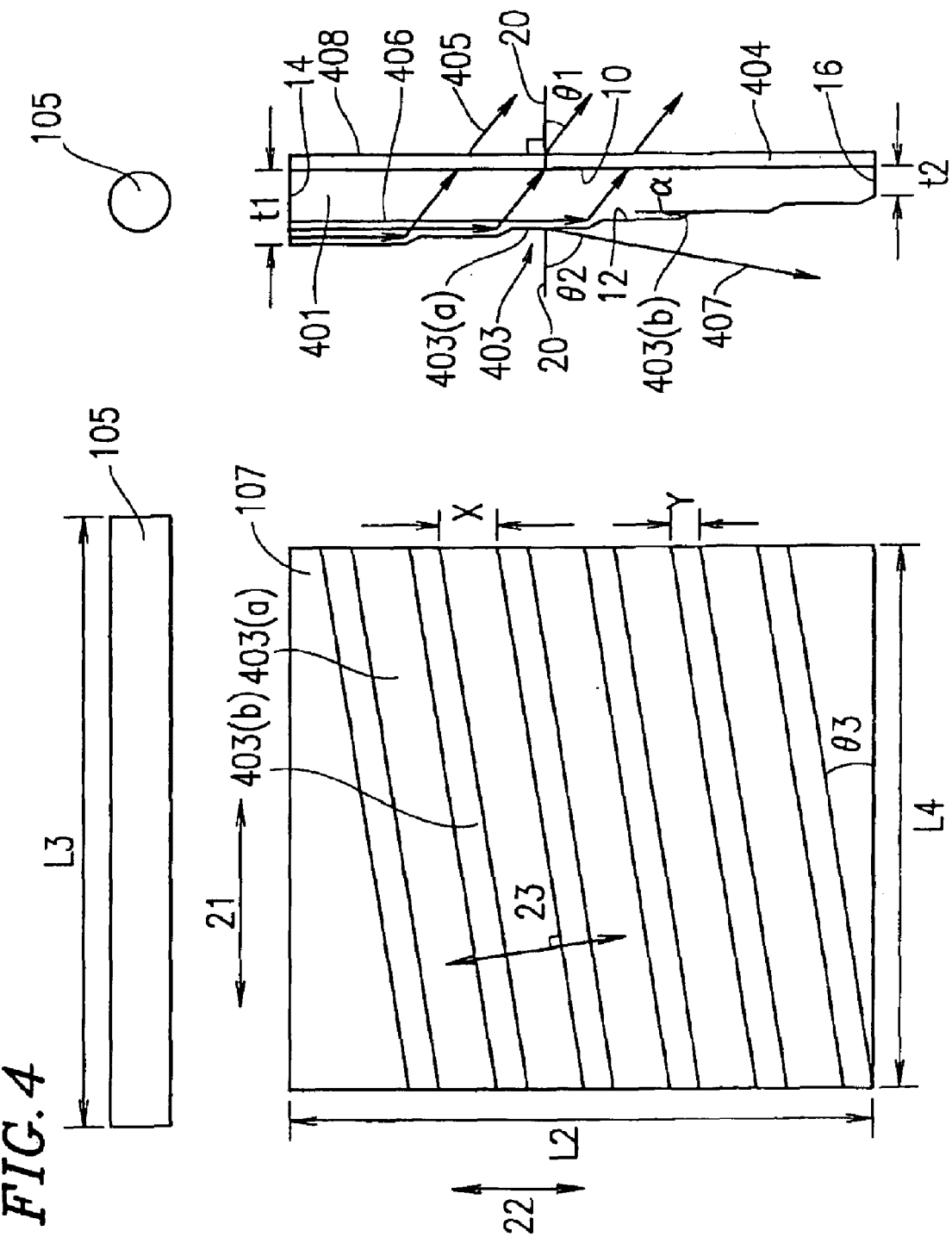
FIG. 4 illustrates the structure of an optical guide member employed in Example 1 of the present invention.

Although the angle θ 3 illustrated in FIG. 4 indicates a counterclockwise rotation, the present invention is not limited thereto. An angle θ 3 that defines a clockwise rotation can be employed as long as the respective periodic structures retain oblique relationships with respect one another (so that the third direction 23 does not coincide with either the first direction 21 or the second direction 22).

The optimum angle θ 3 for the prevention of moire fringes depends on the pitch of the color pixels incorporated in the LCD 200 and the pitch of the prism portions 403 provided on the surface of the optical guide member 104, and is not limited to 20°.

Figure 6:
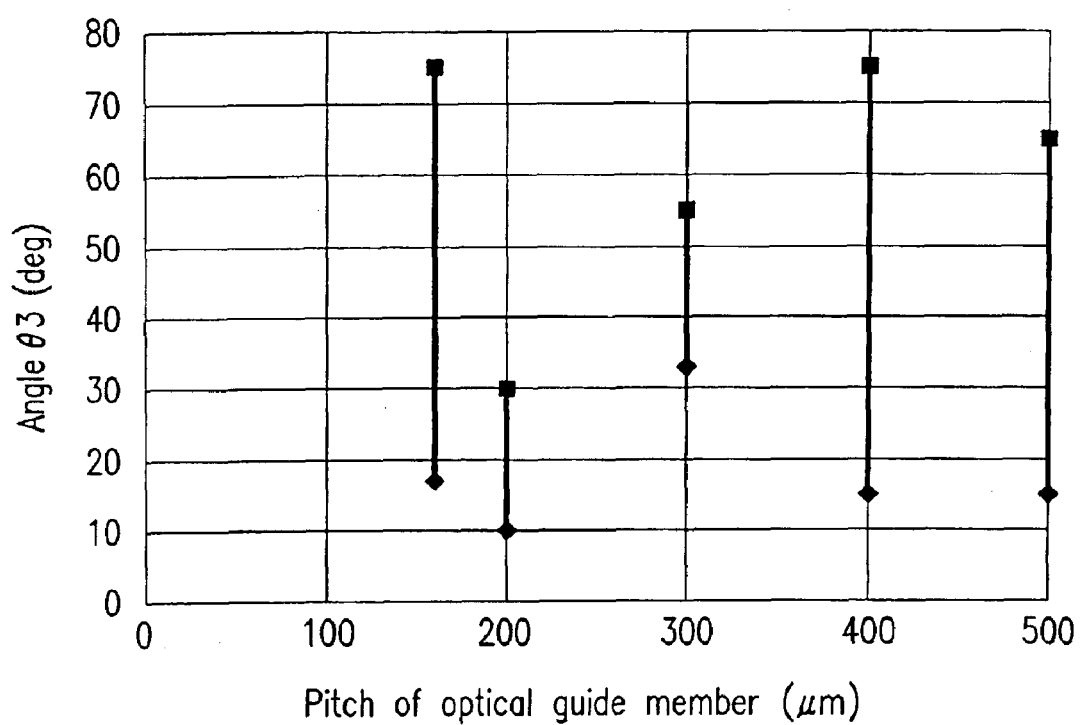
FIG. 6 is a graph illustrating the relationship between the pitch (shown on the x axis) of a periodic structure provided by prism portions of an optical guide member and θ 3 (shown on the y axis) (i.e., an angle between the prism portions of the optical guide member and the direction of a periodic structure provided by an array of color pixels of an LCD).

FIG. 6 is a graph illustrating the relationship between the pitch (shown on the x axis) of a periodic structure provided by prism portions of an optical guide member and θ 3 (shown on the y axis) (i.e., an angle between the prism portions of the optical guide member and the direction of a periodic structure provided by an array of color pixels of an LCD). From FIG. 6, it can be seen that the range of angles which prevents moire fringes varies with the pitch of the prism portions 403 on the optical guide member 104. This angular relationship is also subject to change (as induced by changes in panel size and hence the color pixel pitch). Accordingly, the inventors studied various combinations of the pitch of the prism portions 403 on the optical guide member 104 and color pixel pitches to find out that moire fringes can be prevented by prescribing angle θ 3 to in the range of about 15° to about 75°.

Figure 7:
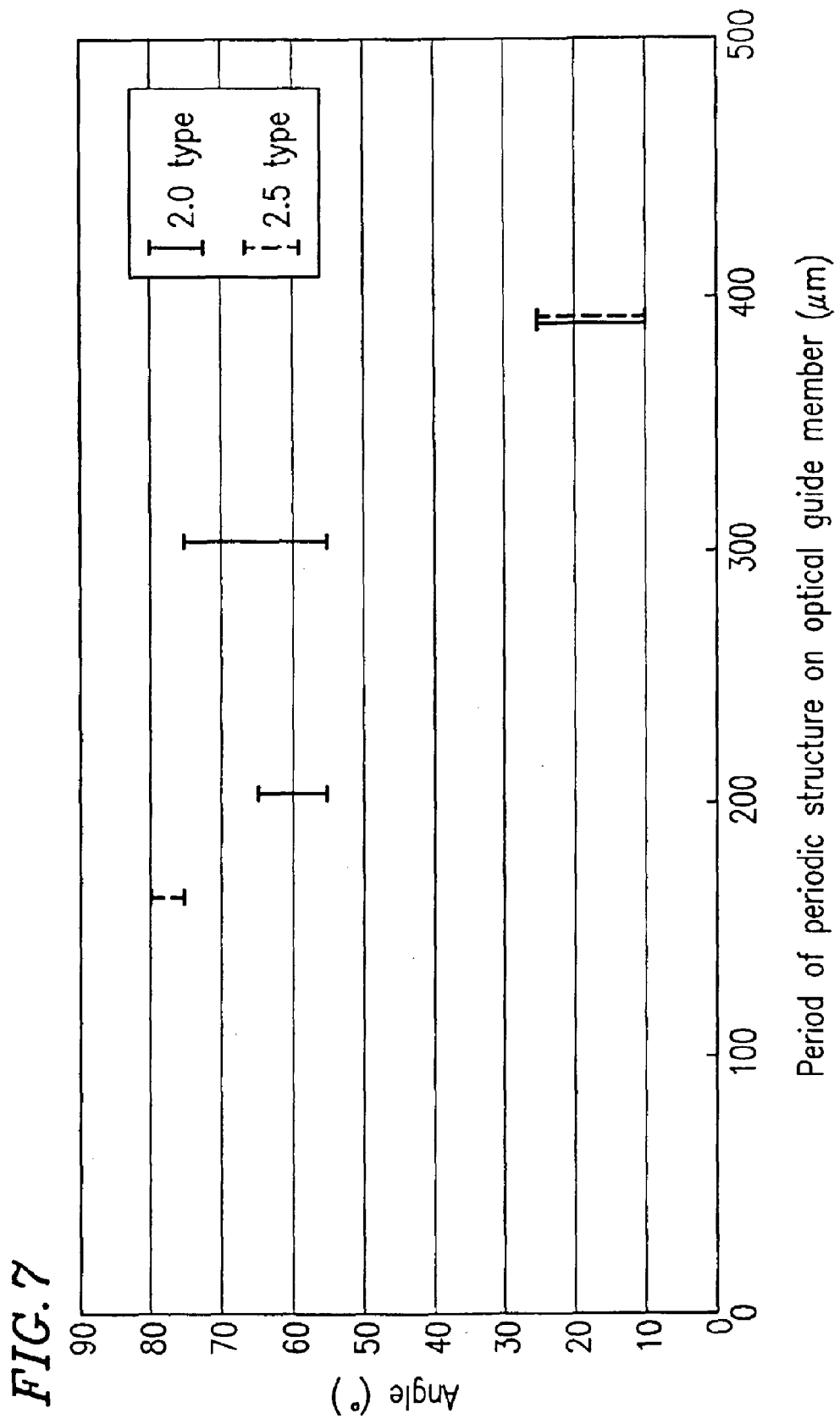
FIG. 7 is a graph illustrating an angular range for preventing moire fringes in a delta arrangement employed in Example 1 of the present invention.
Figure 12:
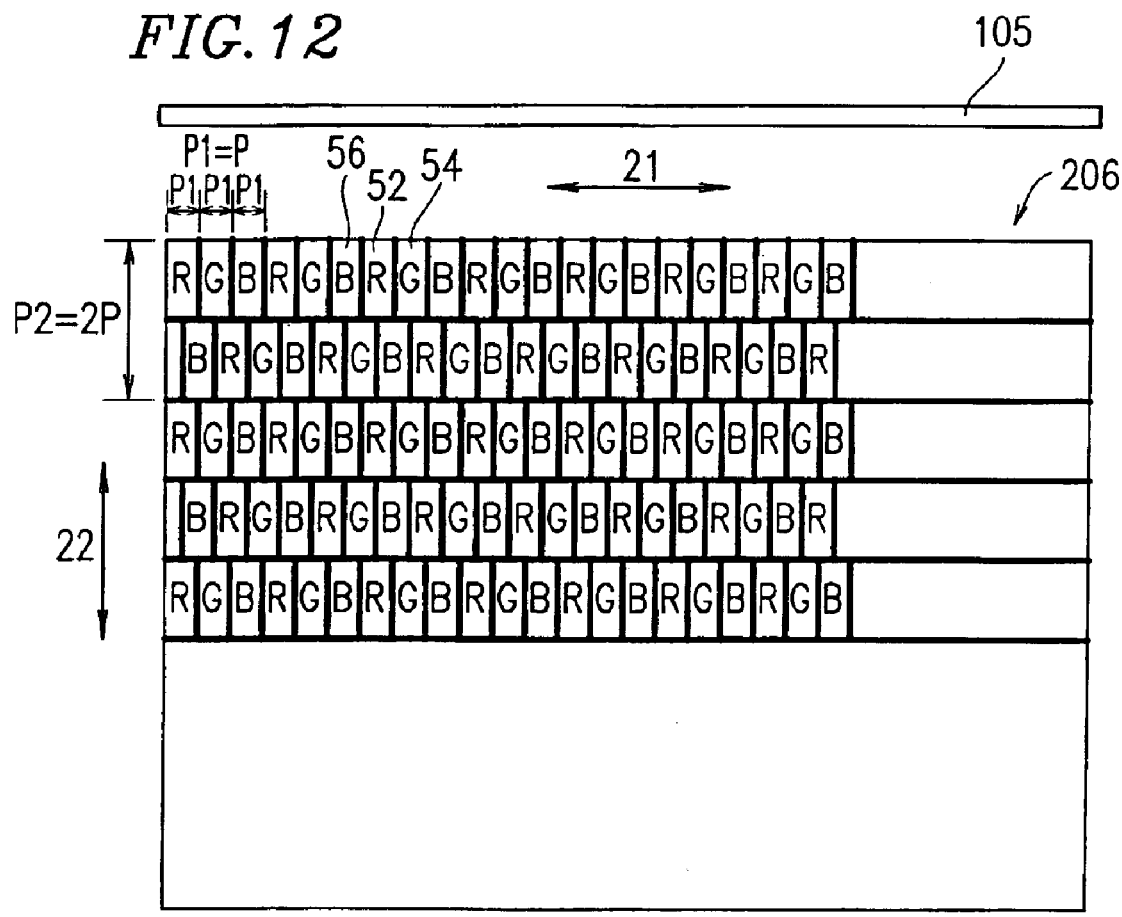
FIG. 12 is a diagram illustrating a pixel pattern of a liquid crystal display apparatus in a delta arrangement.

FIG. 7 illustrates measurements of a range of angles in which moire fringes are not observed in the case of employing a delta arrangement shown in FIG. 12 for the color pixels for the reflection type LCD 200, where a "2.0 type" display (incorporating a color filter 206 including color pixels at a pitch P1 of 0.139 mm along the first direction 21 and color composite pixels at a pitch P2 of 0.278 mm along the second direction 22) or a "2.5 type" display (incorporating a color filter 206 including color pixels at a pitch P1 of 0.169 mm along the first direction 21 and color composite pixels at a pitch P2 of 0.338 mm along the second direction 22). From FIG. 7, it is seen that, in the case where color pixels of a delta arrangement are provided in front of the reflection type LCD 200, effective prevention of moire fringes can be attained when the period structure on the optical guide member 104 and the direction along which the color pixels of the reflection type LCD 200 are arrayed constitute an angle in the range of about 10° to about 25° or about 55° to about 80°.

EXAMPLE 2

Figure 8A:
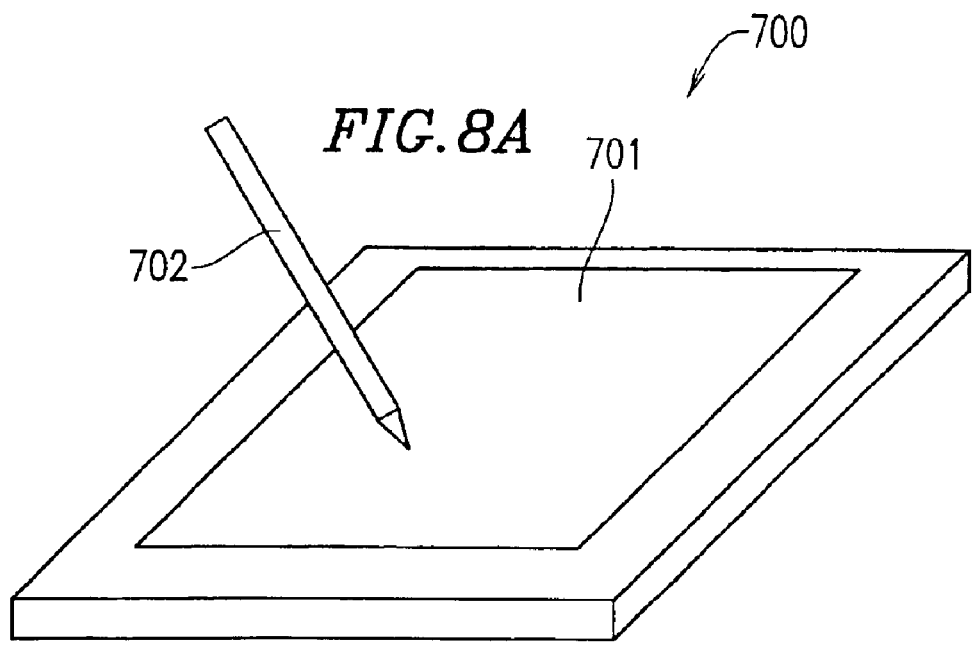
FIG. 8A is a schematic diagram illustrating a portable electronic information device according to Example 2 of the present invention.
Figure 8B:
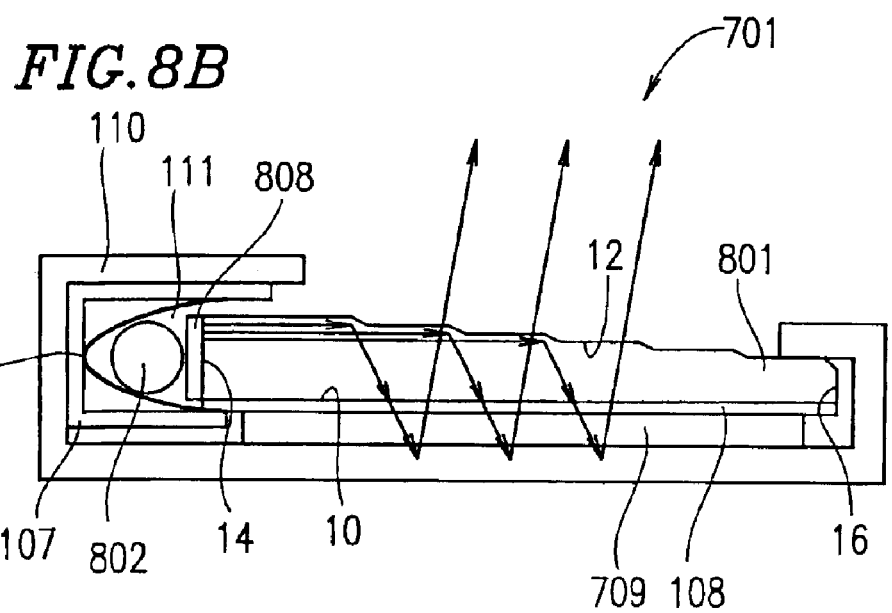
FIG. 8B is a cross-sectional diagram illustrating a liquid crystal display apparatus incorporated in the portable electronic information device shown in FIG. 8A.

Hereinafter, Example 2 of the present invention will be described with reference to FIGS. 8A to 10. An electronic device 700 of Example 2 (shown in FIG. 8A), which may be, for example, a portable electronic information device, includes a liquid crystal display apparatus 701. The liquid crystal display apparatus 701 may double as an operation section. The liquid crystal display apparatus 701 has a fundamental structure similar to that of the liquid crystal display device 101 of Example 1 (FIGS. 1A and 1B) except that, as shown in FIGS. 8A and 8B, the operation section, an illumination section, and a display screen according to the present example are constructed in an integral manner. Moreover, an optical guide member employed in the illumination section according to the present example is configured as described below, and a light source is located in a lower direction of the display region. The portable electronic information device illustrated in the present example employs a pen-type input device 702 along with a touch panel (e.g., of an electromagnetic induction type) for the operation section.

The liquid crystal display apparatus 701 incorporating an illumination section will be illustrated with reference to FIG. 8B. According to the present example, a BEF film 808 (manufactured by Minn. Mining Manufacturing Co.) is disposed between the light source 802 and the optical guide member 801.

Next, the relative locations of the optical guide member 801 and the film 808 will be described with reference to FIGS. 9A to 9C. According to the present example, as shown in FIG. 9C, the BEF film 808 may have, for example, a prism angle of about 90°, a pitch Pb of about 50 μm, an average thickness of about 155 μm, and the light source 802 may be implemented as a CCFT having an effective emission length L3 of about 225 mm which is disposed so as to face prism portions 803 which are formed on the BEF film 808. By retaining a distance g of about 2.3 mm between the BEF film 808 and the optical guide member 801, the effective emission length L3 of the light source 802 is increased to about 229.6 mm, from which light is incident to the optical guide member 801.

By thus employing the BEF film 808, it becomes possible to virtually increase the effective emission length of the CCFT, thereby eliminating the need to employ a CCFT having a particularly large effective emission length L3. As a result, an electronic information device with excellent portability can be provided.

Although the BEF film 808 is illustrated in the present example as a means for enhancing the effective emission length of the CCFT, the present invention is not limited thereto; other films or the like may also be used.

The outer dimensions of the optical guide member 801 may be configured so that it has a horizontal length L4 of about 229.6 mm and a vertical length L2 of about 175 mm, for example. The optical guide member 801 is disposed so as to allow a sufficient portion of incident light to strike the optical guide member 801.

The vertical length L2 of the optical guide member 801 is prescribed at a value which is greater than the vertical length L1 (=about 172.2 mm) of the display region of the display device, so that outgoing light exiting the optical guide member 801 in a generally planar shape can be effectively utilized for display.

According to the illustrated example, the light source 802 is disposed near the end of the display screen where terminals (e.g., source terminals) for coupling the LCD to external display circuitry are provided. The reason is that portable electronic information devices are generally required to have a very narrow display region, so that the wiring for the driving circuitry and the like must often be accommodated in a space near the end of the display screen where the terminals for coupling the LCD to external display circuitry are provided, which space can be conveniently used for accommodating the light source 802 and the like.

The optical guide member 801 is constructed in a general wedge-like shape having a first end face 14 (thickness t1=about 2.5 mm), receiving light from the light source 802, and a second end face 16 (thickness t2=about 0.7 mm) opposite to the first end face.

The prism portions 803 formed on a second principal face 12 of the optical guide member 801 may be constructed so as to have flat portions 803(a) with a width X of about 0.14 mm and slope portions 803(b) with a width Y of about 0.02 mm, for example. The tilt angle α of the slope portions 803(b) can be about 40°, for example.

According to the present example, the prism portions 803 on the optical guide member 801 are formed so that the tilt angle α of the slope portions 803(b) increases as the distance from the light source 802 increases, thereby providing for a uniform distribution of luminance. Specifically, the tilt angle α of the slope portions 803(b) is increased by one degree per block, where one block is defined by every 100 pitches. By means of such prism portions 803, the incident light from the light source 802 disposed in the vicinity of the first end face of the optical guide member 801 is converted into substantially planar outgoing light.

Due to the aforementioned wedge-like shape of the optical guide member 801 and the prism portions 803, the light leaking from the second principal face 12 of the optical guide member 801 can be reduced, while attaining uniform illumination of the display device.

The characteristics of the leak light 807 and the outgoing light 805 from the optical guide member 801 according to the present example are shown in a graph of FIG. 10 similar to FIG. 5. As seen from FIG. 10, a negligible level of leak light 807 emerges when angle θ2 is about 40°, without affecting the perception by the viewer. Since the outgoing light goes out with high efficiency in the range of θ1 from 0° to 10°, good matching is attained with respect to the reflection electrodes of the reflection type LCD (described above), so that the display region can be efficiently illuminated without lowering the contrast.

The prism portions 803 on the optical guide member 801 are formed so that an angle θ3 of about 45° is retained between the periodic structure provided by the prism portions 803 on the optical guide member 801 and the periodic structure of the pixels of the reflection type LCD. As a result of retaining such an angle θ3, it becomes possible to prevent the generation of moire fringes due to interference between the two periodic structures.

A protection plate (of a thin film, for example) may be provided in front of the illumination section so as to prevent the illumination section from being damaged or stained. By forming an anti-surface-reflection film on such a protection plate, any surface reflection which may result in the case of utilizing ambient light for display can be minimized.

Although the above examples illustrate portable electronic information devices, similar effects can be attained with any other devices, e.g., portable electronic video devices.

As described above, a liquid crystal display apparatus according to the present invention can minimize the moire fringe density occurring due to interference, thereby improving its display quality.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus comprising:

an illumination section having a light source and an optical guide member, and a reflection type LCD having a display region including a plurality of pixels for performing a display function, the optical guide member having first and second principal faces opposite to each other and first and second end faces opposite to each other, wherein the reflection type LCD is disposed on or above the first principal face of the optical guide member, wherein light from the light source enters the optical guide member at the first end face, exits the optical guide member at the first principal face so as to be incident on the reflection type LCD and reflected therefrom, reenters the optical guide member at the first principal face, and exits the optical guide member at the second principal face toward a viewer, wherein the reflection type LCD includes a plurality of color composite pixels and a color filter layer having a regular array of a plurality of color filters, each of the plurality of color composite pixels including a plurality of color pixels, each of the plurality of color pixels being defined by a corresponding one of the plurality of color filters, the plurality of color pixels having a pitch P1 along a side of each color pixel, and the plurality of color composite pixels having a pitch P2 along a side of each color composite pixel, the pitch P1 being smaller than the pitch P2, each of the color pixels being arranged with respect to the light source such that the side having the pitch P1 is perpendicular to the light entering the first end face of the optical guide member, each of the color composite pixels being arranged with respect to the light source such that the side having the pitch P2 is parallel to the light entering the first end face of the optical guide member, and the light source being disposed in the vicinity of a side of the display region extending substantially in parallel to the side of each color pixel having pitch P1.

2. A liquid crystal display apparatus according to claim 1, wherein the light source is disposed in an upper or lower direction of the display region so that the viewer is located in a direction of specular reflection to which light emitted from the illumination section is subjected at the reflection type LCD.

3. A liquid crystal display apparatus according to claim 2, wherein the light source is disposed in an upper direction of the display region of the reflection type LCD.

4. A liquid crystal display apparatus according to claim 3, wherein the optical guide member includes a periodic structure formed on the second principal face, the periodic structure including propagation portions and reflection portions alternating along a third direction, and
wherein the incident light from the light source is subjected to total reflection at the reflection portions.

5. A liquid crystal display apparatus according to claim 1, wherein the light source is disposed near an end of the reflection type LCD where terminals for coupling the reflection type LCD to external display circuitry are provided.

6. A liquid crystal display apparatus according to claim 1, wherein the light source is disposed in the vicinity of the first end face of the optical guide member, and wherein a width t1 of the first end face and a width t2 of the second end face of the optical guide member substantially satisfy t1>t2.

7. A liquid crystal display apparatus according to claim 1, wherein the optical guide member includes a periodic structure formed on the second principle face, the periodic structure including propagation portions and reflection portions alternating along a third direction.

8. A liquid crystal display apparatus according to claim 7, wherein the third direction coincides with neither the first direction nor the second direction.

9. A liquid crystal display apparatus according to claim 8, wherein the third direction of the periodic structure on the optical guide member is at an angle of about 10° to about 25° from the first direction.

10. A liquid crystal display apparatus according to claim 8, wherein the third direction of the periodic structure on the optical guide member is at an angle of about 55° to about 80° from the first direction.

11. A liquid crystal display apparatus according to claim 1, wherein the optical guide member includes an antireflection element provided on the first principle face.

12. A liquid crystal display apparatus according to claim 1, wherein a light shielding member is disposed corresponding to a connection or transition portion between the optical guide member and the light source.

13. An electronic device incorporating the liquid crystal display apparatus according to claim 1.

14. A liquid crystal display apparatus according to claim 1, wherein the ratio P1:P2 is between 1:2.0 and 1:2.5.

15. A liquid crystal display apparatus comprising:
an illumination section having a light source and an optical guide member, and a reflection type LCD having a display region including a plurality of pixels for performing a display function, the optical guide member having first and second principal faces opposite to each other and first and second end faces opposite to each other,
wherein the reflection type LCD is disposed on or above the first principal face of the optical guide member, and
wherein light from the light source enters the optical guide member at the first end face, exits the optical guide member at the first principal face so as to be incident on the reflection type LCD and reflected therefrom, reenters the optical guide member at the first principal face, and exits the optical guide member at the second principal face toward a viewer,
wherein the optical guide member includes a periodic structure formed on the second principal face, the periodic structure including propagation portions and reflection portions alternating along a third direction at an angle from said light source, and
wherein the third direction coincides with neither a first direction parallel to the light source nor a second direction perpendicular to the light source, and is coplanar with said second principal face of the optical guide member.

16. A liquid crystal display apparatus, comprising:
a LCD having a reflection electrode and a region including a plurality of pixels for performing a display function; and
an optical guide member having first and second principle faces opposite to each other, and a first end face;
said LCD includes a plurality of color pixels and a color filter layer having a regular stripe array of a plurality of color filters,
the plurality of color pixels having a pitch P1 parallel to the first end face, and the plurality of color pixels having a pitch P2 perpendicular to the first end face, the pitch P1 being smaller that the pitch P2,
wherein light from a light source enters said optical guide member at the first end face and exits from said optical guide member at the first principal face to be incident on said LCD, and
wherein light entering at the first end face travels along the longer pitch P2 of the color pixels.

17. The liquid crystal display device according to claim 16, wherein said guide member has a periodic structure at the second principal face.

18. The liquid crystal apparatus according to claim 16, wherein a light reflected by the reflection electrode enters said optical guide member at the first principal face.

19. A liquid crystal display apparatus, comprising:
a LCD having a reflection electrode and a region including a plurality of pixels for performing a display function; and
an optical guide member having first and second principle faces opposite to each other, and a first end face;
said LCD includes a plurality of color composite pixels and a color filter layer having a regular delta array of a plurality of color filters, each of the color composite pixels having a plurality of color pixels,
the plurality of color pixels having a pitch P parallel to the first end face, and the plurality of color composite pixels having a second pitch of 2P perpendicular to the first end face,
wherein light from a light source enters said optical guide member at the first end face and exits from said optical guide member at the first principal face to be incident on said LCD, and
wherein light entering at the first end face travels along the longer second pitch of the color pixels.

20. The liquid crystal display device according to claim 19, wherein said guide member has a periodic structure at the second principal face.

21. The liquid crystal apparatus according to claim 19, wherein a light reflected by the reflection electrode enters said optical guide member at the first principal face.

* * * * *